United States Patent [19]

Picard et al.

[11] 4,089,510

[45] May 16, 1978

[54] SCREW EXTRUDER

[75] Inventors: Jacques Picard, Teheran, Iran; Marc Saunier, Saint Medard en Jalles; Jean L. Tranchant, Vert le Petit, both of France

[73] Assignee: Societe Nationale des Poudres et Explosifs, France

[21] Appl. No.: 724,999

[22] Filed: Sep. 20, 1976

[30] Foreign Application Priority Data

Oct. 1, 1975 France ............................... 75 30099

[51] Int. Cl.[2] ........................... B29B 1/10; A29C 1/06

[52] U.S. Cl. ...................................... 366/83; 425/208; 100/53; 100/146

[58] Field of Search ................ 259/192, 193; 425/208, 425/209, 151; 85/61; 285/2; 100/53, 145, 146, 147

[56] References Cited

U.S. PATENT DOCUMENTS

| | | | |
|---|---|---|---|
| 602,378 | 4/1898 | Thomson | 285/2 |
| 975,990 | 11/1910 | Overton et al. | 100/147 |
| 1,777,294 | 10/1930 | Dellenbarger | 259/192 |
| 3,458,894 | 8/1969 | Wheeler | 259/191 |
| 3,542,047 | 10/1970 | Nelson | 285/2 |
| 3,696,736 | 10/1972 | Studli | 100/146 |
| 3,746,315 | 7/1973 | Rizzi | 259/21 |

*Primary Examiner*—Herbert F. Ross
*Attorney, Agent, or Firm*—Bucknam and Archer

[57] ABSTRACT

A screw extruder comprises a casing connected to a bed, the casing comprising two portions connected together longitudinally by connecting elements. At least one of the casing portions is articulated with respect to the bed, and the connecting elements are adapted to release the connection between the casing portions at a predetermined casing pressure to allow the casing portion to articulate to thereby open the casing.

16 Claims, 3 Drawing Figures

SCREW EXTRUDER

The present invention relates to a screw-extruder particularly, though not exclusively, for the continuous manufacture of pyrotechnical compositions and more particularly of propellants based on nitrocellulose gelled with an explosive oil.

Conventional manufacture of this type of propellant includes on the one hand an agglomeration and gelatinization operation on a paste of propellant by heating and compression in heated rolling-mills, and on the other hand an extrusion operation on the agglomerated paste in extrusion presses in order to obtain propellant extrusions which are then cut to the required length for constituting propellant charges.

However, apart from the fact that such manufacture is essentially discontinuous, the duration of manufacture is very long, more especially as this manufacture includes numerous manual interventions during charging and discharging of the rolling-mills and extrusion presses. In addition it is dangerous, taking into account the risks of outbreak of fire or of explosion during the course of the operations of agglomeration and extrusion.

Conventional manufacture is still widely employed but for some 20 years various methods of manufacture have been perfected by employing for certain operations screw-mixers and screw-presses for working of propellants of any nature as well as for working explosives. The screw presses which exist at present do not carry out continuously the whole of the operations of manufacture but on the contrary necessitate the use of complex installations including a number of screw appliances as described in, for example, the German Pat. No. 1,048,212. The operations of mixing and extrusion must be carried out under relatively high temperature and pressure conditions which introduces risks of outbreak of fire or of explosion, and numerous safety devices are put in position on the screw-presses, for example, on a level with the screw itself, which necessitates the employment of a dead volume in the heart of these presses and without the control installations of these presses being protected.

According to the invention there is provided a screw extruder having a screw casing connected to a bed, the casing comprising two portions connected together longitudinally by connecting elements, at least one of the casing portions being articulated with respect to the bed, and the connecting elements being adapted to release the connection between the casing portions, in use, at a predetermined casing pressure, to allow said at least one casing portion to articulate to thereby open said casing.

The provision of the casing opening when the casing pressure reaches a predetermined value enables the risks of fire or explosion in an extruder processing pyrotechnical composition to be minimized.

In the preferred embodiment of the invention the casing contains two extrusion-screws mounted for rotation about parallel axes and is connected at one end to the bed, thereby overhanging the bed. The free end of the casing has a converging portion and an extrusion die. Also provided are means for driving the extrusion-screws in rotation, means for ensuring thermal regulation of the screws and of the casing, and means for feeding the casing with matter to be processed.

The casing portions are connected together along a joint-surface passing substantially through the axes of the said extrusion-screws, at least one of the two casing portions is articulated with respect to the bed about an axis which is substantially parallel with the joint-surface and perpendicular to the axes of the extrusion-screws and the casing.

The connecting elements comprise tie-rods having a zone of rupture the rupturing strength of which lies between 1.3 and 1.8 times and preferably is substantially equal to 1.5 times the maximum internal operational pressure of the extruder.

The two casing portions are terminated by a seating having an inclined surface which seats against a dihedral abutment on the bed in order to ensure vertical self-centering of the casing with respect to the extrusion screw during running of the extruder. A seating equipped with a part spherical surface which comes to bear against a part spherical bearing surface on the bed may be employed for ensuring total self-centering.

The downstream end of the casing in the embodiment is supported at rest by an adjustable, retractable prop in order to ensure correct position of the two casing portions about the extrusion-screws.

Each casing portion in the embodiment comprises a number of sections fixed to a frame articulated to the bed. More particularly, the frame comprises an assembly plate arranged parallel with the joint-surface of the casing portions and extending outwardly from the longitudinal sides thereof, the lateral edges of the said plate being drilled with holes for the mounting of the tie-rods. Each frame likewise comprises a pair of support members connected firmly to the assembly plate and articulated by their ends to the bed about trunnions.

Advantageously, the mounting holes for the tie rods are split up to the edge of the plates in order to ensure rapid assembly or dismantling of the casing portions.

The extruder forming the preferred embodiment is provided with two feeding units. The first unit feeds material to be processed during operation of the extruder and includes a rotary mixer and a proportioner metering screw. The second unit feeds inert material before starting and before stopping of the extruder, and includes a hopper with a valve. Both units open into the same feed inlet in the casing and the delivery from the units is selectively controlled. The tie rods may comprise bolts having clamping nuts or alternatively short-stroke jacks may take the place of the clamping nuts for adjusting the force of the connection between the casing portions where necessary to the maximum internal operational pressure.

In order that the invention may be well understood, the preferred embodiment thereof, which is given by way of example only, will now be described in more detail, reference being made to the accompanying drawings, in which.

Figure 1:
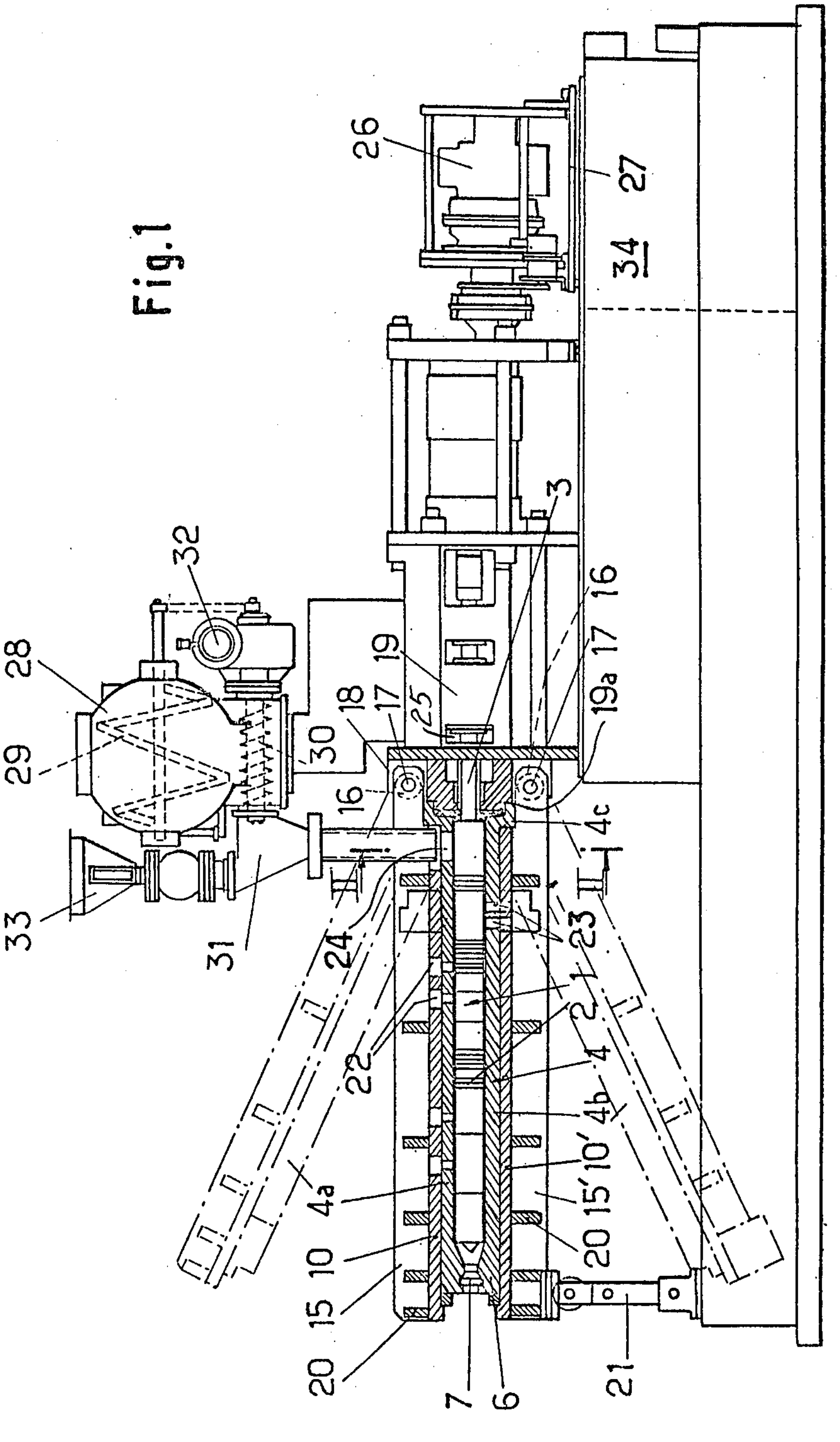
FIG. 1 is a side elevation in section of an extruder.
Figures 2, 3:
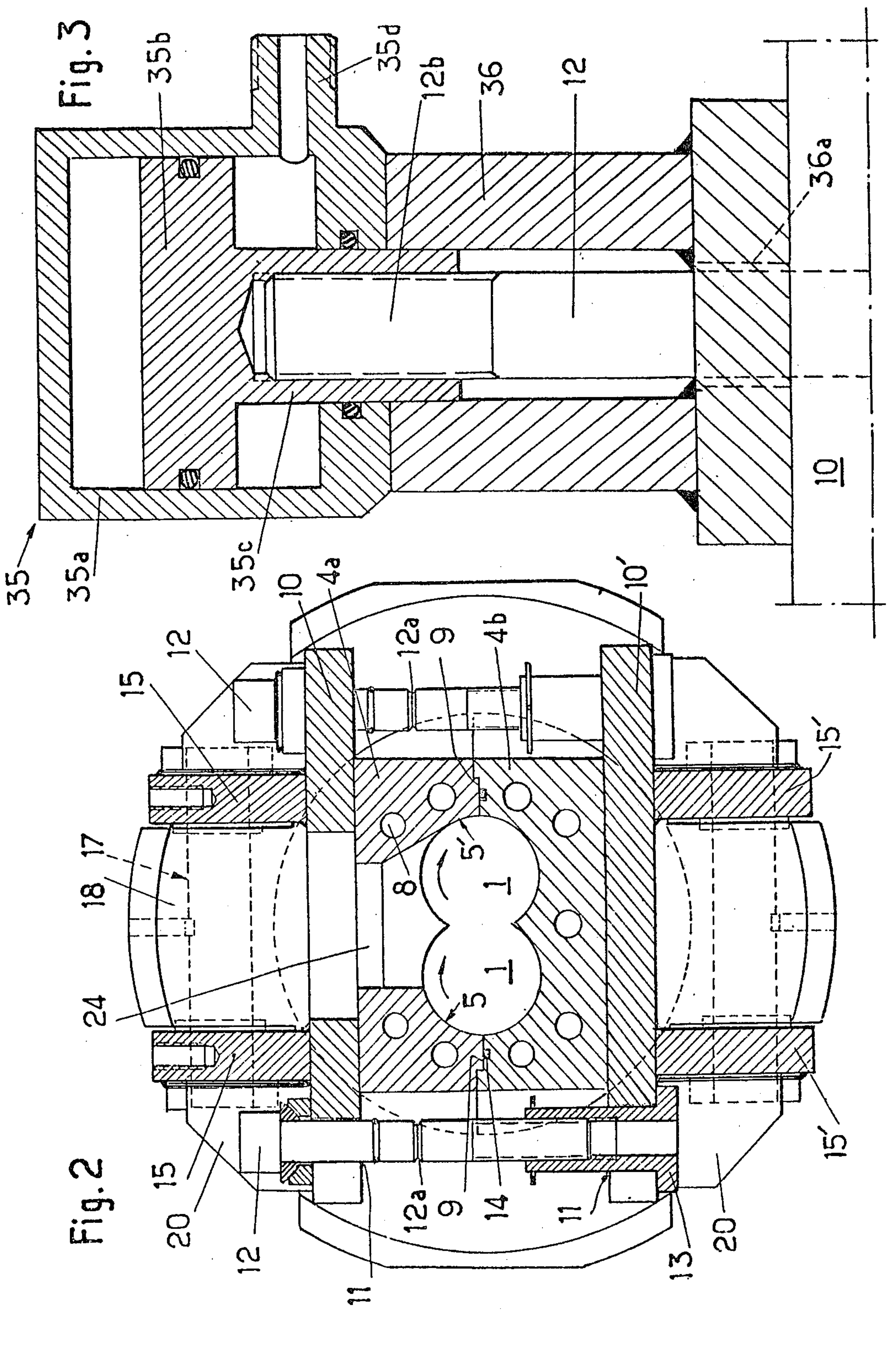
FIG. 2 is a section along II—II in FIG. 1.
FIG. 3 is a section of a jack of a connecting member.

Referring to FIGS. 1 and 2 of the drawings, the extruder, which is mounted on and overhangs the main portion 34 of a bed, includes a pair of identical extrusion-screws 1 with parallel axes, meshing together without friction, and comprising elements 2 of special configuration for achieving from an upstream end to a downstream end a predetermined sequence of operations of extrusion, the said elements being placed side by side round two splined shafts 3, bored to provide two thermal regulation circuits, namely, a first peripheral circuit for the circulation of a fluid for thermal regulation, and a second axial circuit for the double circulation of a second fluid.

A casing 4 of the extruder is provided with two intersecting cylindrical bores 5,5′ with parallel axes, of diameter slightly larger than that of the extrusion-screws and intended to house the extrusion-screws. The casing 4 is terminated at one end with a converging portion 6 which is provided with a seating 7 for receiving a one piece ferrule for the attachment of extrusion dies. Channels 8 for the circulation of a thermal regulation fluid are likewise provided in the wall of this casing in the immediate vicinity of the bores 5,5′. The casing 4 is formed in two portions 4*a*, 4*b* connected together along a longitudinal joint surface 9 passing through the axes of the extrusion-screws. In the embodiment these portions are two half-casings which are each formed of a number of sections, and are fixed and butted against a frame comprising two assembly plates 10,10′ arranged on opposite sides of the half-casings parallel with the joint surface between the latter and extending outwardly from the two longitudinal sides of the half-casings. The side edges of these plates are provided with openings 11 for the mounting of connecting members comprising tie rods formed by bolts 12, which have rupture necks 12*a*, and nuts 13*a* provided with centering seatings to provide a firm connection between the two half-casings. The breaking-strength of the bolts is chosen to be equal to between 1.3 and 1.8, and preferably substantially 1.5 times the maximum internal operational pressure foreseen for the matter being processed in the extruder. Fluid sealing between the half casings is obtained by the interposition of a toroidal seal 14. To each of the plates 10,10′ is firmly connected a pair of elongate support members 15,15′, which extend longitudinally of the plates. The ends of the members 15,15′ located at the upstream end of the extruder terminate in heads 16, and are articulated about a trunnion 17 carried by a flat support 18 provided on a support structure 19 upstanding from the bed. The hinge-type articulation of each of the two half-casings on to the structure 19 constitutes a safety element and facilitates maintenance by enabling opening "like compasses" of these two half-casings (as shown in dotted line in FIG. 1 of the drawing) either in the event of rupture of the necked bolts 12 as a result of abnormal increase in the internal pressure in the extruder or in the event of normal dismantling for cleaning and maintenance of the extruder.

The frame carrying the half-casings is in addition reinforced by transverse ribs 20.

A tilting, retractable or otherwise adjustable prop 21 attached to the bed supports the downstream end of the bottom half casing 4*b* and enables adjustment of the two half-casings for their correct position around the two extrusion-screws to be ensured during standstill of the extruder. This prop can be retracted during running of the extruder to enable self-centering of the said half-casings and extrusion screws. Similarly, the upstream portion of the half-casings is terminated by a flared seating portion having a part spherical surface 4*c* which seats against a part spherical abutment 19*a* arranged on the corresponding face of the structure 19, and thereby fixed relative to the bed, in order to ensure self-centering of the half-casings and of the extrusion-screws during running. Alternatively, the seating may have an inclined surface which seats against a dihedral abutment to provide vertical 'self centering'.

In addition, degassing apertures 22 are arranged through the top half-casing 4*a* and the corresponding plate 10 for the passage of vacuum pipework, and drain-wells 23 are provided through the bottom half-casing 4*b* and the corresponding plate 10′ for the exhaust of the liquids extracted from the matter being processed. An opening 24 is provided through the top half-casing 4*a* and the corresponding plate 10 upstream of the said elements for feeding the extruder with matter to be processed.

The ends of the splined shafts 3 of the extrusion-screws revolve in bearings 25 integral with the structure 19, and they are driven in rotation via an extrusion set by a geared motor 26 mounted on a cradle 27.

Feeding of the extruder with matter to be processed is ensured by a constant-flow proportioner unit 28 comprising a hopper of generally spherical shape equipped with a rotary mixing arm with blades 29 and a horizontal shaft, and communicating through its bottom portion with a proportioner or metering screw 30 with a horizontal shaft which emerges at the end into a feedpipe 31 leading to the feed inlet 24 on the extruder by way of a transparent flexible tube. Driving of the mixing arm and of the proportioner screw 30 is achieved through a geared motor 32, and the proportioner assembly can tilt.

Furthermore the feedpipe 31 is likewise in communication through a valve with a hopper 33 of a second unit forming a reserve for inert matter.

The feed of thermal regulation fluids of the extrusion-screws and of the half-casings is provided through flexible pipes at the level of the structure 19.

The extruder is useful for the preparation and extrusion of any plastic composition, especially for the manufacture of pyrotechnical compositions and more particularly of rods of propellant having a base of nitrocellulose gelatinized by an explosive oil such as nitroglycerine. By way of non-restrictive example, in what follows is described the operation of the extruder in such a manufacture.

The mixture to be extruded is a propellant having a double base without solvent, which has the following compositions:

| | Parts by weight |
|---|---|
| slab (of 66% nitrocellulose and 34% nitroglycerine) | 90 |
| centralite | 3 |
| various additives | 10 |

The moisture content of the mixture is 21% and its apparent density is 0.3.

Before starting the extruder the extrusion-screws 1,1′ and the half-casings 4*a*, 4*b* are heated to working temperature by admission of heating fluids, on this occasion water at 80° C, into the thermal regulation circuits. Then the extruder is started and fed with the inert matter, on this occasion cellulose as non-nitrated fibres proceeding from the hopper 33 in order to put the extruder under pressure and to centre the extrusion-screws. Finally the prop 21 is retracted, the valve for admission of inert matter is closed, the geared motor 32 is started in order to drive the mixing arm 29 and the proportioner screw 30 in rotation and feed the extruder at constant flow with the propellant mixture defined above and contained in the proportioner 28, via the feedpipe 31 and the feed opening 24 in the casing.

This mixture passes in succession from the upstream end of the extruder through:

a. a first gelatinization zone (in which the elements 2 on the extrusion-screws comprise, for example, threaded elements and eccentric discs offset angularly);

b. a first expansion zone (in which the elements 2 are formed by a very coarse pitch thread) enabling drying on a level with the wells 23 for draining off the liquor from drying;

c. a second gelatinization zone (where the elements 2 comprise threaded elements and eccentric discs off-set angularly);

d. a second zone of expansion under vacuum (where the elements 2 are formed by a very coarse pitch thread on a level with the two first degassing orifices 22 which are connected to a high flow suction pump for maintaining a relative vacuum and exhausting the water vapour);

e. a third gelatinization zone similar to the second gelatinization zone;

f. a third zone of expansion under vacuum where the elements 2 are formed by a very coarse pitch thread on a level with the two last degassing orifices 22 which are connected to a vacuum pump for maintaining a high vacuum and for perfecting the dehydration of the mixture); and finally g. a compression zone (where the elements 2 are formed by a fine pitch thread for putting under progressive pressure the gelatinized mixture ready for extrusion); this zone stops before the converging portion 6.

So at the output from the die which follows after the said convergence a rod of propellant is obtained which has a low moisture content of the order of 0.3%.

For example a rod of propellant of diameter 30 mm has been obtained at a flow of 18 kg/h with a speed of rotation of the extrusion-screws of 12 rpm and with extrusion-screws 85 mm in diameter and 1300 mm in useful length. The pressure which prevails in the converging portion 6 lies between 200 and 300 bars.

Similarly before stopping the extruder the feed of the propellant mixture is stopped and inert matter is again admitted in order to maintain the centering of the extrusion screws with respect to the casing until extrusion of the propellant mixture is complete. The bolts 12 necked for rupture for assembly of the two half-casings are calibrated to ensure rupture at an internal pressure in the top casing higher by, say, 50% at most than the maximum operational pressure.

As soon as this value is exceeded, for example, in the event of an accidental outbreak of fire in the mixture, these bolts break on a level with the necks 12*a* and the two half-casings 4*a*, 4*b* open instantly "like compasses" about the axes of their trunnions 17, thus letting escape both the gases of combustion and the mixture in course of extrusion, thus avoiding the burning mixture proceeding into the explosive state.

These half-casings in their open position likewise constitute a sort of thermal shield effectively protecting the whole of the installation which lies behind the half-casings against any hurling of matter and against any turning back of flames. Again, additionally cold water may be injected into the thermal regulation circuits and even through the degassing apertures and the feed hoppers.

In accordance with the variant shown in FIG. 3 of the drawing the bolts 12 with rupture necks 12*a* (FIG. 1) or firmly connecting the two assembly plates 10,10' of the half-casings 4*a*, 4*b* are implemented by hydraulic jacks 35 of very short stroke for adjusting the force of the connection between the two half-casings, for example, to the maximum internal operational pressure foreseen for the matter being processed. Thus, the head of the bolt 12 is replaced by a hydraulic jack including a substantially cylindrical body 35*a* inside which slides a piston 35*b* the rod 35*c* of which is tapped at the end in order to be screwed on to the end 12*b*, which is threaded for this purpose, of the shank of the bolt 12. The hydraulic fluid for control of the jack is admitted through a lateral pipe 35*d* provided in the vicinity of the bottom of the cylindrical body 35*a*. The bottom of the body 35*a* acts against the top assembly plate 10 by means of a stirrup 36 having a hole 36*a* for passing through this end of the bolt, the rod of the said jack being screwed on to the threaded end of the bolt 12. Admission of hydraulic fluid into the jack forces the piston 35*b* upwards, which pulls against the shank of the bolt 12 and so causes the plates 10,10' to approach and close the half-casings which are integral with these plates. The force of connection between the half-casings may thus be adjusted to the maximum internal operational pressure.

With a view to obtaining rapid dismantling of the assembly bolts 12 during maintenance operations, the smooth holes 11 and 36*a* through which they pass are split up to the edges of the plates 10,10' and the stirrups 36. Moreover at least one of the two half-casings is advantageously connected to the end of a long-stroke jack in order to facilitate the opening of the casing "like compasses". However, this long-stroke jack may be uncoupled from the casing during operation of the extruder so as to enable instant opening of this casing in the event of accidental overpressure.

Whilst in the described embodiment where both half casings are articulated with respect to the bed, the screws are fixed rigidly to the motor 26 by splined shafts 3, it is to be understood that the screws may be mounted to float, for example by means of a universal joint, for example when only one of the half casings is articulated with respect to the bed.

Thus, it will be seen that we have provided a screw-extruder with an openable casing which enables all the operations of propellant agglomerization and gelatinization (drying, homogenization, malaxation, compression) to be carried out continuously and the agglomerated paste to be gauged by means of suitable dies, and which enables the risks of explosion to be eliminated or minimized whilst enabling the achievement of a compact installation which automatically ensures the protection of the control installations.

We claim:

1. A screw extruder having a bed, two extrusion screws mounted for rotation about parallel axes, and a screw casing connected at one end to the bed, the casing comprising two portions connected together longitudinally by connecting elements, at least one of the casing portions being hinge-articulated with respect to the bed, and the connecting elements being adapted to release the connection between the casing portions, in use, at a predetermined casing pressure to allow said at least one casing portion to articulate to thereby open said casing and wherein the casing portions are connected together along a joint surface passing substantially through the longitudinal axis of the casing, said at least one casing portion being articulated with respect to the bed about an axis which is substantially parallel to said joint surface and perpendicular to said casing axis.

2. An extruder as claimed in claim 1, wherein the extrusion screws are fixed relative to the bed.

3. An extruder as claimed in claim 2, wherein the extrusion screws are rigidly fixed to means for rotatably driving the same.

4. An extruder as claimed in claim 1, wherein the connecting elements are adapted to release said at least one casing portion at an internal casing pressure from 1.3 to 1.8 times the maximum operational pressure.

5. An extruder as claimed in claim 1, wherein the connecting elements comprise tie rod means having a rupture zone adapted to rupture when the casing pressure reaches said predetermined value.

6. An extruder as claimed in claim 1, wherein the connecting elements comprise nut and bolt means.

7. An extruder as claimed in claim 1, wherein the connecting elements consist of tie rods which comprise bolts and jack means for adjusting the force of the connection between the casing portions.

8. An extruder as claimed in claim 1, wherein both casing portions are articulated with respect to the bed so that they open away from each other when the connection between them is released.

9. An extruder as claimed in claim 8, wherein each of the casing portions has a seating portion provided with a surface which seats against an abutment fixed relative to the bed.

10. An extruder as claimed in claim 9, wherein said seating portion comprises an inclined surface and said abutment is substantially dihedral.

11. An extruder as claimed in claim 9, wherein said seating portion and said abutment comprise substantially part spherical surfaces.

12. An extruder as claimed in claim 8, wherein each casing portion comprises a plurality of sections fixed to a frame which frame is connected with respect to the bed so as to provide said hinge articulation.

13. An extruder as claimed in claim 12, wherein each frame comprises a plate member arranged parallel with the joint surface of the respective casing portion and extending outwardly from the longitudinal sides thereof, the plate member being provided with openings for receiving said connecting elements.

14. An extruder as claimed in claim 13, wherein each frame further comprises elongate support members fixed to said plate member and extending longitudinally thereof, said support members being mounted about trunnion means fixed relative to said bed to provide said articulation of the casing portions.

15. An extruder as claimed in claim 1, further comprising adjustable prop means for supporting said other end of the casing.

16. An extruder as claimed in claim 1, provided with material feeding means comprising an inlet into the casing, a first unit including mixing means and metering means for delivering material to be processed to said inlet, a second unit for delivering inert material to said inlet and means for selectively controlling the delivery from said units.

* * * * *